Patented Jan. 12, 1926.

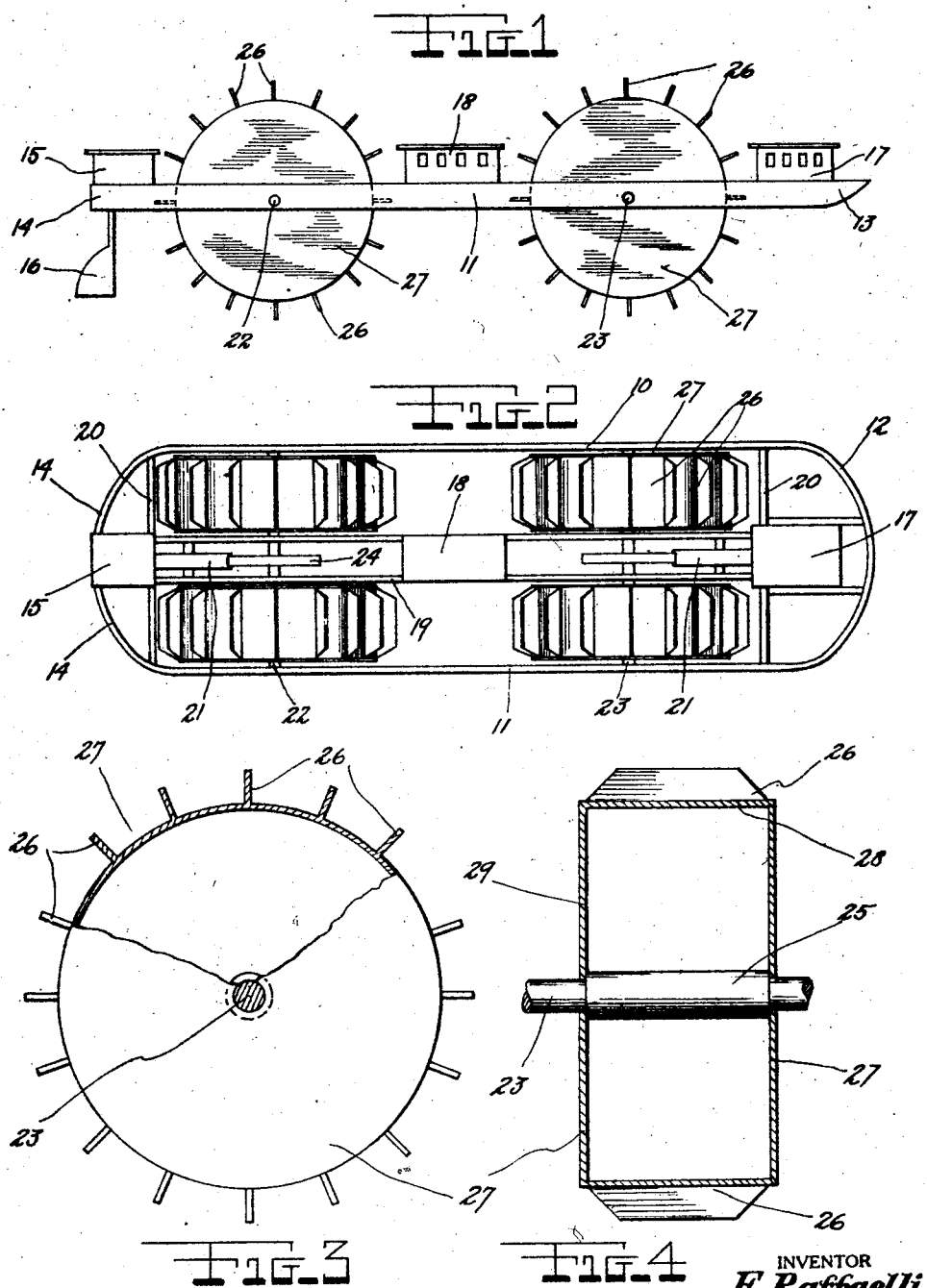

1,569,392

UNITED STATES PATENT OFFICE.

FERRUCCIO RAFFAELLI, OF NEW YORK, N. Y.

SEA CAR.

Application filed November 6, 1924. Serial No. 748,020.

*To all whom it may concern:*

Be it known that I, FERRUCCIO RAFFAELLI, a citizen of Italy, residing at New York, in the county of New York and State of New York, have invented certain new and useful Improvements in Sea Cars, of which the following is a specification.

The main object of this invention is to provide a sea car of large dimensions so as to be capable of transporting a large number of people and freight across oceans at high speed. In the design of vessels used for crossing large expanses of water, the trend is toward a greater speed so as to cut down the maximum amount of travel hours necessary to arrive at a destination. For these reasons, the structure illustrated in the drawings is provided with numerous paddle wheels situated fore and aft which are rotated at a relatively great speed and are driven by gearing whose power is generated upon the vessel.

The above and other objects will become apparent in the description below, in which characters of reference refer to like-named parts in the drawing.

Referring briefly to the drawing, Figure 1 is a side elevational view of the sea car.

Figure 2 is a top plan view of the same.

Figure 3 is a front elevational view of one of the paddles showing the portions of the drum broken away.

Figure 4 is a sectional elevational view of Figure 3.

Referring in detail to the drawing, the numerals 10 and 11 indicate the sides of the ship. These sides are of relatively large dimension and their surfaces provide gangways around the vessel. The bow 12 joins the sides 10 and 11 at the forward end and is rounded or semi-circular and has its keel 13 stream-lined so as to provide the minimum amount of resistance to forward travel. The stern 14 of the vessel also has a rounded outline and is surmounted by a cabin 15 which serves as a power generating plant for one of the propelling units. A rudder 16 extends downwardly from the stern of the ship and is operated from an observation cabin 17, the latter being located and mounted on the bow 12. Intermediate the length of the vessel, a passenger cabin 18 is provided which may be of such large dimensions as to provide convenient quarters for a large number of passengers and freight, fuel, and similar bulk. The passenger cabin is mounted on inner frames 19 which extend thruout the greater portion of the length of the vessel and have their ends connected to cross frames 20. These frame members 19 are mutually spaced apart and have provided between them a train of gears 21 which serve as means for rotating shafts 22 and 23 upon which the propelling means are mounted. These means comprise units of relatively large paddle wheels which are rigidly mounted on the shafts 22 and 23. Each of the shafts 22 and 23 have gears 24 which are intermeshed with gears 21 and are rigidly mounted thereon between the frame 19, and near each end of said shafts, enlarged portions 25 forming hubs are provided. These hubs are of the same length as the width of the paddle wheels upon which blades 26 are mounted. On each side of the hub 25, a relatively large annular wall 27 is provided, the peripheries of said walls being joined by an encircling band 28. The blades 26 have converging sides and are narrowest at their extreme outer edges.

The inventor believes that a vessel designed as illustrated on the drawings is capable of relatively great speed and will travel large distances in comparatively shorter time. The outline of the vessel permits the same to be easily maneuvered and turned about in its course in a short radius by aid of the rudder 16. The paddle wheels which are used in units of two are driven from the outer cabins 17 and 15 thru a chain of gears, one of which is rigidly secured to the shafts 23 upon which the paddle units are mounted. Figures 3 and 4 introduce the novel type of paddle wheel whose feature is that the walls 27 and 28 form a hermetically sealed drum in which a chamber 29 is provided, said chambers being sealed to assist in giving buoyancy to the craft.

I claim:—

A sea car comprising a longitudinal body having side frames and a semi-circular bow and stern, a rudder pivoted beneath the stern, paddle wheels mounted between the side frames of said body, the paddle wheels being mounted in units of two on a single shaft and mutually spaced-apart, said paddle wheels comprising hollow drums having flat side faces, blades radiating from the peripheries of said drums, the blades extending entirely across the width of said drums, the longitudinal sides of said blades converging toward each other, the blades being narrowest at the extreme edge, said drums being hermetically sealed to aid the car as a buoyancy agent.

In testimony whereof I affix my signature.

FERRUCCIO RAFFAELLI.